United States Patent
Tokunaga et al.

(10) Patent No.: US 8,307,811 B2
(45) Date of Patent: Nov. 13, 2012

(54) FUEL PUMP MOUNTING STRUCTURE OF MOTORCYCLE

(75) Inventors: Katsuhiko Tokunaga, Shizuoka (JP); Yuji Suzuki, Shizuoka (JP)

(73) Assignee: Suzuki Motor Corporation (JP)

( * ) Notice: Subject to any disclaimer, the term of this patent is extended or adjusted under 35 U.S.C. 154(b) by 138 days.

(21) Appl. No.: 12/832,279

(22) Filed: Jul. 8, 2010

(65) Prior Publication Data

US 2011/0011470 A1    Jan. 20, 2011

(30) Foreign Application Priority Data

Jul. 17, 2009    (JP) ................................. 2009-168996

(51) Int. Cl.
     *F02M 37/04*    (2006.01)
     *B01D 24/00*    (2006.01)
(52) U.S. Cl. ..................................... 123/509; 210/416.4
(58) Field of Classification Search .................. 123/509, 123/469, 497; 417/410.1; 210/416.4
See application file for complete search history.

(56) References Cited

U.S. PATENT DOCUMENTS

| | | | |
|---|---|---|---|
| 5,040,516 A * | 8/1991 | Haraguchi | 123/509 |
| 6,907,865 B1 * | 6/2005 | Hanby | 123/509 |
| 6,913,693 B2 | 7/2005 | Unuki | |
| 2002/0144943 A1 | 10/2002 | Unuki | |
| 2003/0102033 A1 * | 6/2003 | Dasilva et al. | 137/565.17 |
| 2003/0102035 A1 * | 6/2003 | Dasilva et al. | 137/565.34 |

FOREIGN PATENT DOCUMENTS

JP      2002-303220 A    10/2002

* cited by examiner

*Primary Examiner* — Stephen K Cronin
*Assistant Examiner* — Sherman Manley
(74) *Attorney, Agent, or Firm* — Troutman Sanders LLP

(57) ABSTRACT

A fuel pump unit is mounted on a predetermined position in a fuel tank. There are a supporting mechanism to support the fuel pump unit at the mounting position and a holding mechanism to fixing and holding the fuel pump unit supported at the mounting position, and an opening portion through which the fuel pump unit is inserted into the fuel tank is closed by a cover member being a separate body from the supporting mechanism and the holding mechanism.

4 Claims, 7 Drawing Sheets

F I G. 8
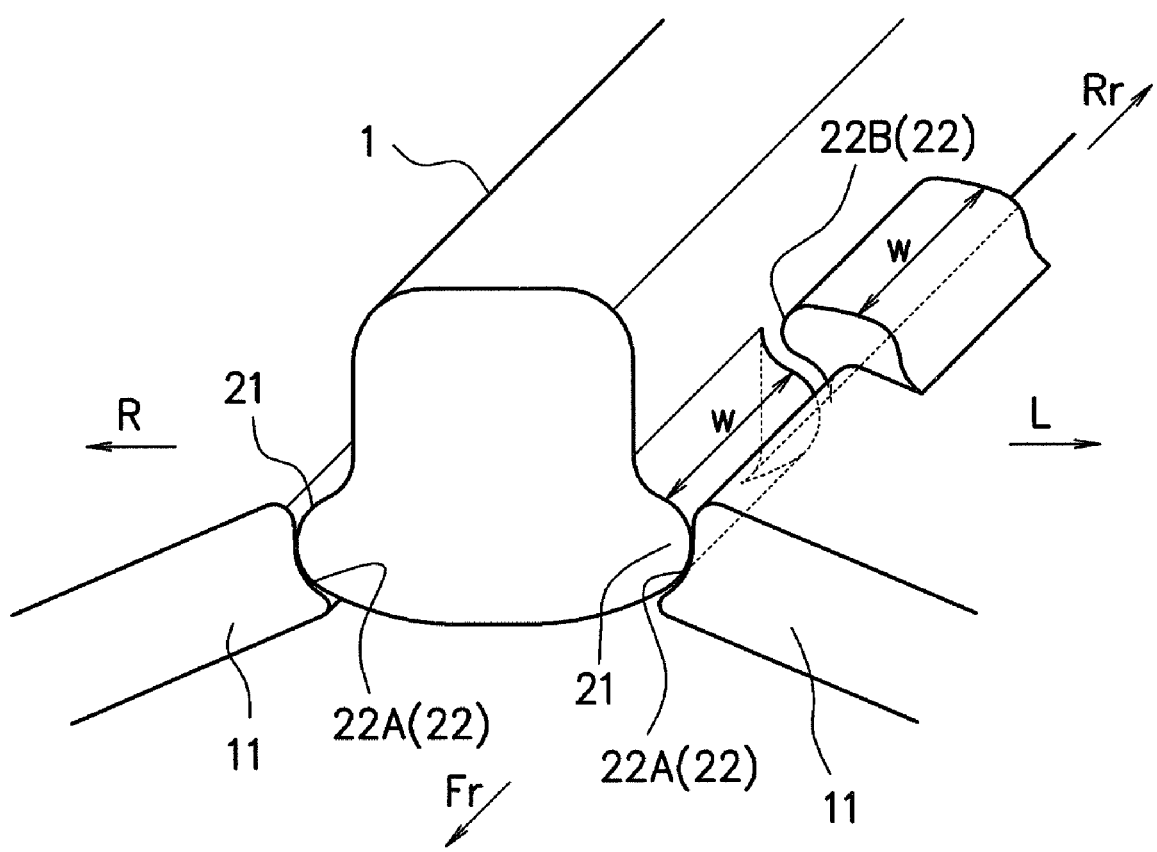

FUEL PUMP MOUNTING STRUCTURE OF MOTORCYCLE

CROSS-REFERENCE TO RELATED APPLICATIONS

This application is based upon and claims the benefit of priority of the prior Japanese Patent Application No. 2009-168996, filed on Jul. 17, 2009, the entire contents of which are incorporated herein by reference.

BACKGROUND OF THE INVENTION

1. Field of the Invention

The present invention relates to a structure for mounting an intank type fuel pump in particular in a motorcycle.

2. Description of the Related Art

In a fuel tank of a motorcycle, what is called an intank type fuel pump is disposed in a fuel tank. In that case, an opening portion from which the fuel pump is put is provided in a proper place of the fuel tank, and the fuel pump is supported via a stay or the like by utilizing a ceiling portion or a bottom portion of the fuel tank. For example, in an intank type fuel pump device described in Patent Document 1, a fuel pump is mounted in a bottom portion of a fuel tank.

Further, in a concrete mounting structure of a fuel pump, a supporting member supporting the fuel pump and a flange (seal portion) closing an opening portion of the fuel tank are unified. In that case, though a fuel pump unit is inserted from the opening portion provided in a bottom portion of the fuel tank, the supporting member of the fuel pump is constituted in a flange shape, and a seal member such as a gasket or an O-ring is inserted into the flange portion.

Further, in mounting a fuel pump unit on a fuel tank, mounting is performed by tightening of a bolt or the like (including mason jar method, cam-lock method or the like), and in view of workability, a supporting member is disposed on an outer surface of the fuel tank.

[Patent Document 1] Japanese Laid-open Patent Publication No. 2002-303220

In the above-described structure in which the supporting member of the fuel pump and the flange are unified, as a result that excessive acceleration is generated, such as when a vehicle jumps in particular, a substantial load works around the flange portion into which a seal member is inserted. As for what is called an off-road type in particular, a height of jump is quite high and acceleration generated in that occasion is quite large.

Further, when the fuel pump is mounted in a ceiling portion of the fuel tank by bolt tightening, a height of the fuel pump unit is required to be set individually in order to reduce a fuel remaining amount.

Further, as for a fuel tank made of synthetic resin in particular, a distance (length) from a ceiling portion to a bottom portion of the fuel tank sometimes changes due to deformation called swelling, and it leads to a change of a dead remaining amount of fuel.

SUMMARY OF THE INVENTION

The present invention is made in view of the aforementioned circumstances and an object thereof is to provide a fuel pump mounting structure of a motorcycle in which a fuel pump can be mounted properly and effectively and mounting workability or the like can be effectively improved.

A fuel pump mounting structure of a motorcycle of the present invention is a fuel pump mounting structure for mounting a fuel pump unit on a predetermined position in a fuel tank, the fuel pump mounting structure includes a supporting mechanism supporting the fuel pump unit at the mounting position and a holding mechanism fixing and holding the fuel pump unit supported at the mounting position, wherein an opening portion from which the fuel pump unit is inserted into the fuel tank is closed by a cover member being a separate body from the supporting mechanism and the holding mechanism.

Further, in the fuel pump mounting structure of the motorcycle of the present invention, the supporting mechanism includes a guide projection provided in a bottom portion of the fuel tank and recessed and protruding portion provided in a side surface portion of the fuel pump unit, and the guide projection and the recessed and protruding portion are engaged to each other thereby to support the fuel pump unit.

Further, in the fuel pump mounting structure of the motorcycle of the present invention, the holding mechanism includes an expandable stay member elastically biasing the fuel pump unit supported at the mounting position in a holding manner.

Further, in the fuel pump mounting structure of the motorcycle of the present invention, the recessed and protruding portion of the supporting mechanism and the holding mechanism are constituted integrally with the fuel pump unit and are inserted into the fuel tank via the opening portion.

BRIEF DESCRIPTION OF THE DRAWINGS

FIG. 8 is a view showing a modification example of a fuel pump unit supporting mechanism according to the present invention.

DETAILED DESCRIPTION OF THE PREFERRED EMBODIMENTS

Hereinafter, a preferred embodiment of a fuel pump mounting structure of a motorcycle according to the present invention will be described based on the drawings.

Figure 1:
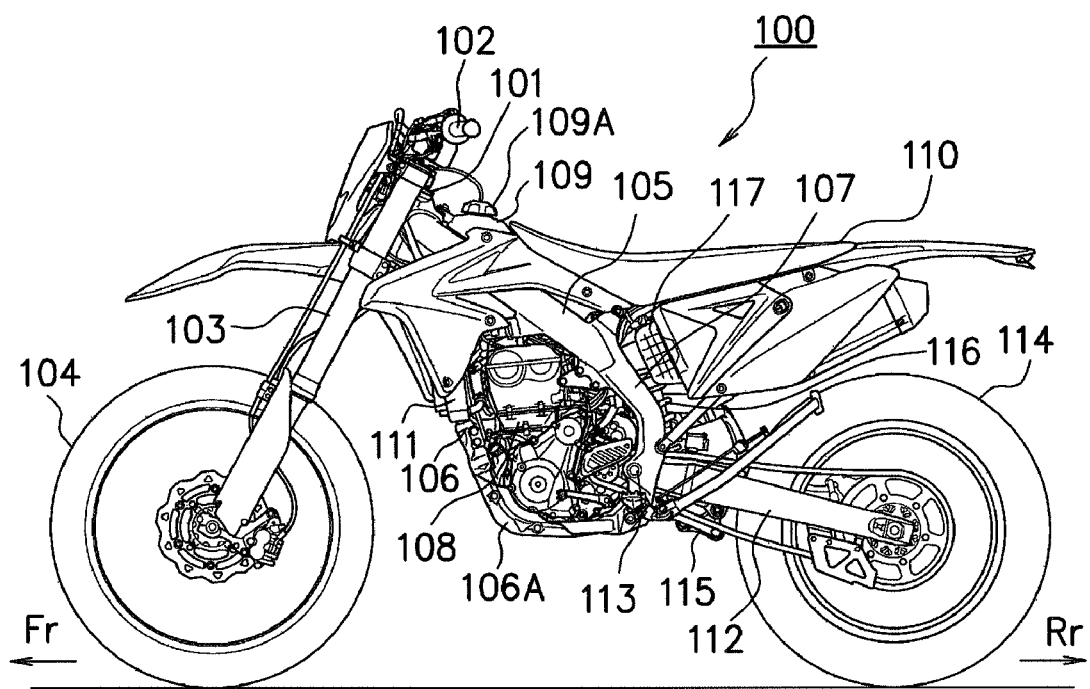
FIG. 1 is a side view showing an example of a motorcycle according to an embodiment of the present invention.

FIG. 1 is a left side view of the motorcycle having the fuel pump mounting structure according to the present invention. First, an entire constitution of a motorcycle 100 will be described by using FIG. 1. It should be noted that in the following description in each drawing including FIG. 1 a front of the vehicle is indicated by an arrow Fr, a rear of the vehicle is indicated by an arrow Rr, a lateral right side of the vehicle is indicated by an arrow R, and a lateral left side of the vehicle is indicated by an arrow L, as necessary.

The motorcycle 100 of FIG. 1 can be typically an off-road type motorcycle, and a steering head pipe 101 is disposed in an upper part of a vehicle body front and a not-shown steering shaft is pivotally inserted through the steering head pipe 101. A handle 102 is bound to an upper end of the steering shaft, while a front fork 103 is mounted to a lower end of the steering shaft, a front wheel 104 being a running wheel being rotatably supported at a lower end of the front fork 103.

Further, from the steering head pipe 101, a right and left pair of main frames 105 extends inclining obliquely downward toward a vehicle body rear and a down tube 106 extends almost vertically downward. The down tube 106 branches into the right and the left as lower frames 106A around a lower portion of the down tube 106. A pair of these lower frames 106A extends downward and then is bent at almost a right angle toward the vehicle rear, rear end portions thereof being coupled with respective rear end portions of the main frames 105 via the right and left pair of body frames 107.

In a space surrounded by the right and left pair of main frames 105 and the down tubes 106 and the lower frames 106A and the body frames 107, an engine 108 of water-cooling type being a drive source is mounted, and a fuel tank 109 is provided above the engine 108, a seat 110 being provided in a rear thereof. It should be noted that a fuel supply port of the fuel tank 109 is plugged by a cap 109A. Further, a radiator 111 is disposed in a front of the engine 108.

Front end portions of rear swing arms 112 are supported vertically swingable by means of a pivot shaft 113 by the right and left pair of body frames 107 provided at a lower portion of almost a center in a front and rear direction of the vehicle body. A rear wheel 114 being a drive wheel is rotatably supported at rear end portions of the rear swing arms 112. The rear swing arms 112 are suspended from the vehicle body via a link mechanism 115 and a shock absorber 116 (rear wheel suspension system) connected thereto.

In a case described above, a fuel pump unit is disposed in the fuel tank 109 as described later, and fuel is supplied to the engine 108 by the fuel pump unit. Meanwhile, an air cleaner box 117 is disposed in a rear side of the shock absorber 116, and the air cleaner box 117 and the engine 108 are coupled via an intake path. It should be noted that though not shown the intake path is connected to an intake port provided in a cylinder head of the engine 108 and a throttle body is disposed along the way as a part of the intake path. A fuel injector is provided in the throttle body, and a predetermined amount of fuel is supplied from the fuel pump unit to the fuel injector at a predetermined timing.

Figure 2:
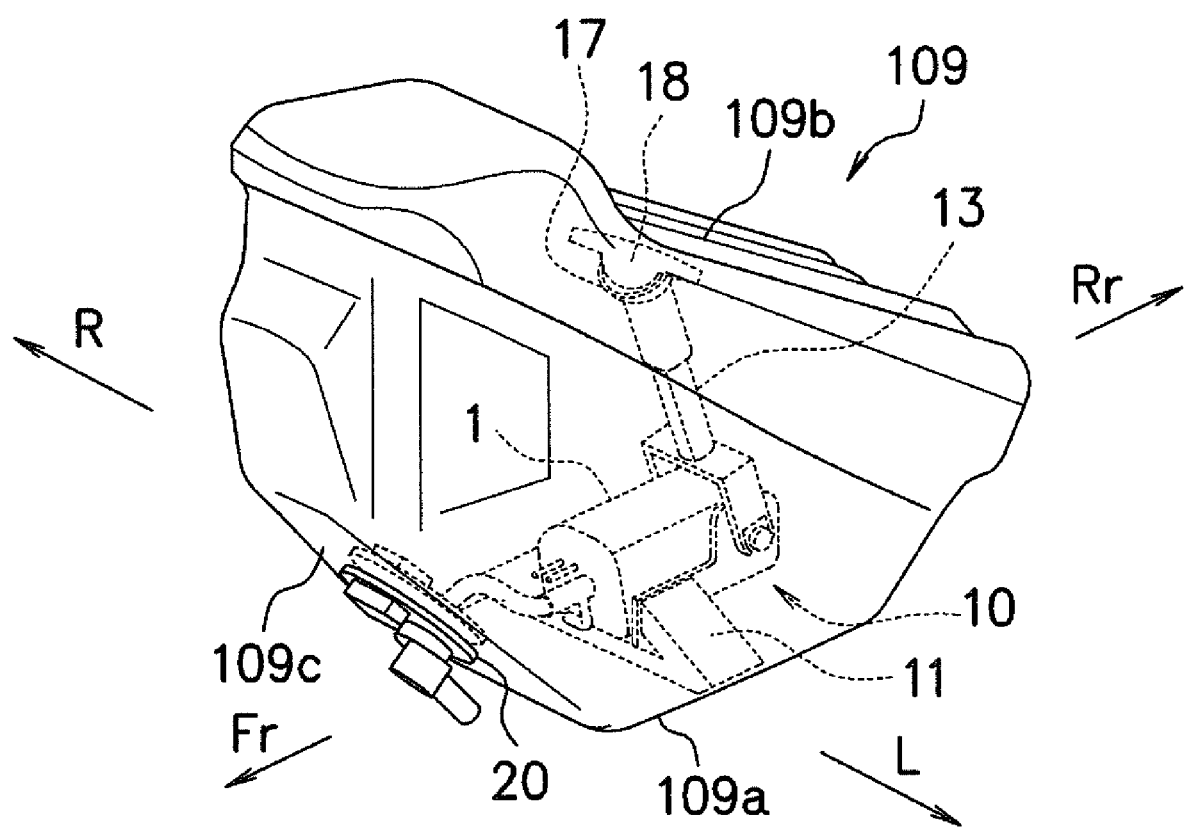
FIG. 2 is a perspective view showing a constitution example of a fuel tank in which a fuel pump unit in an embodiment of the present invention is mounted.
Figure 3:
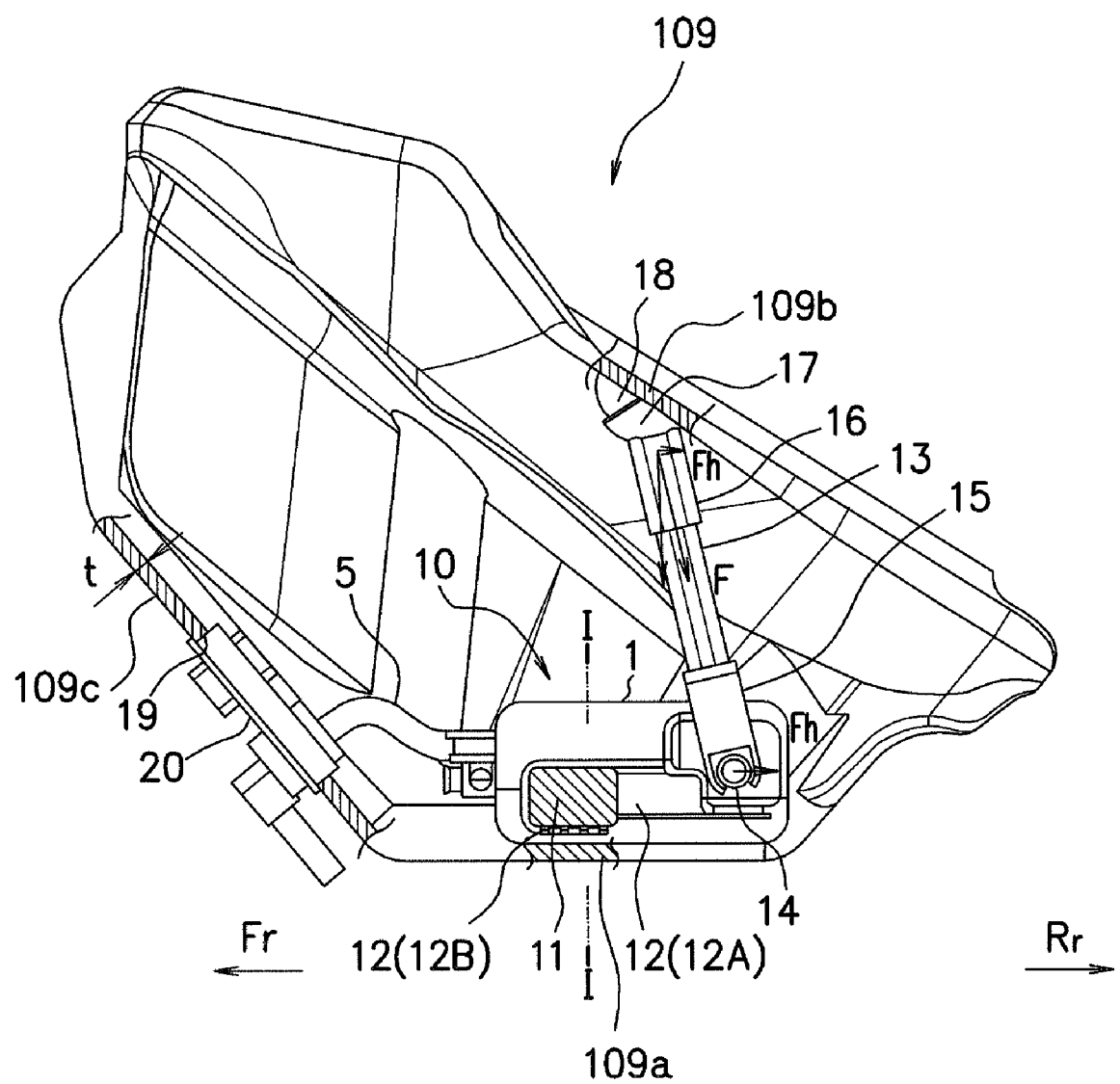
FIG. 3 is a cross-sectional view showing a constitution example of the fuel tank in which the fuel pump unit in the embodiment of the present invention is mounted.

Next, FIG. 2 and FIG. 3 show a fuel pump mounting structure in the fuel tank according to the present invention. The fuel tank 109 is mounted on a vehicle body by using the main frames 105 or the like. As in a shown example, there are a bottom portion 109a which is at least comparatively plane, a ceiling portion 109b inclined higher in a forward direction and a forward inclined portion 109c connected to a front side of the bottom portion 109a inclined higher in a forward direction, which have indefinite shapes, and the fuel pump unit 10 is disposed in the bottom portion 109a of the above. A hollow shell body (a part thereof is indicated by shaded lines in FIG. 3) forming the fuel tank 109 has a predetermined plate thickness t.

The fuel pump unit 10 houses later-described fuel pump and filter (strainer) and the like in a casing 1, having a unitized constitution. The casing 1 has an almost box shape, and an R shape is attached to a corner of the box. In this embodiment, the fuel pump unit 10 is supported almost horizontally along the front and rear direction above the bottom portion 109a.

In the present invention, there is a supporting mechanism supporting the fuel pump unit 10 at its mounting position (in a state of FIG. 2 and FIG. 3) and a holding mechanism fixing and holding the fuel pump unit 10 supported at the mounting position, and a cover member closing an opening portion from which the fuel pump unit 10 is inserted inside the fuel pump 109 is constituted as a separate body from the supporting mechanism and the holding mechanism.

Next, these supporting mechanism and holding mechanism will be described. First, the supporting mechanism includes a guide projection 11 provided in the bottom portion 109a of the fuel tank 109 and a recessed and protruding portion 12 provided on a side surface portion of the fuel pump unit, and the guide projection 11 and the recessed and protruding portion 12 are engaged to each other to support the fuel pump unit 10.

Figure 4:
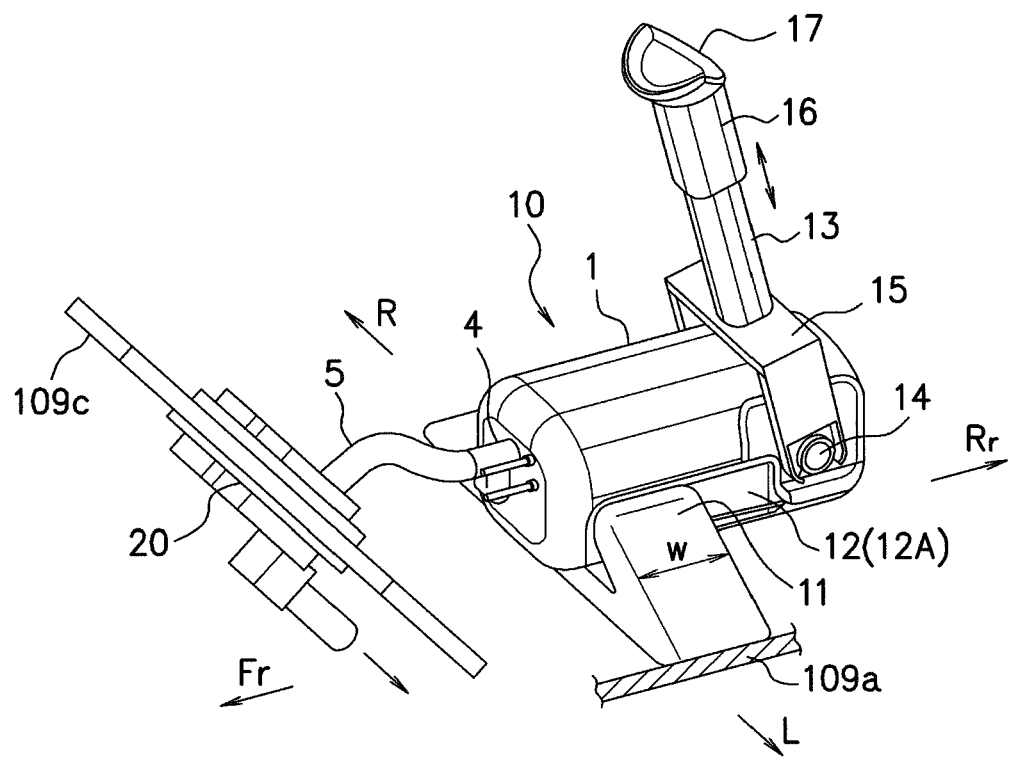
FIG. 4 is a perspective view showing a constitution example of vicinity of the fuel pump unit in the embodiment of the present invention.
Figure 5:
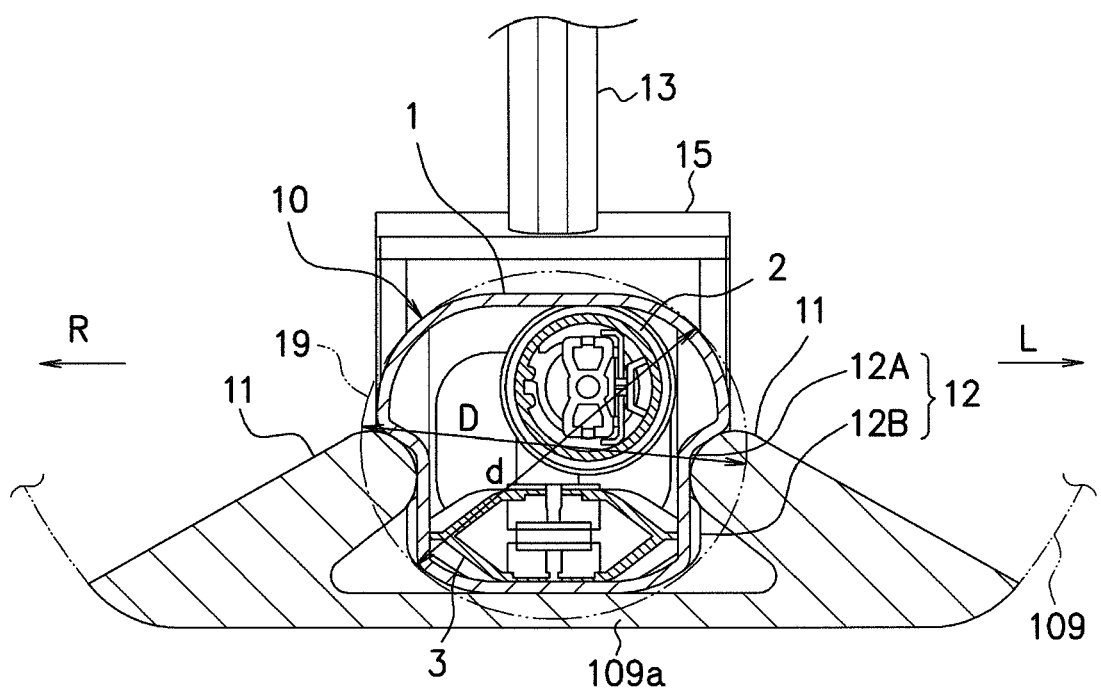
FIG. 5 is a cross-sectional view along a line I-I of FIG. 3.

With further reference to FIG. 4, a right and left pair of the guide projections 11 is provided in a manner to project diagonally upward from the bottom portion 109a, and constituted so that the right and left pair of the guide projections 11 can sandwich both side surfaces of the casing 1 of the fuel pump unit 10 as will be described later. As shown in FIG. 5, the casing 1 is disposed between the pair of guide projections 11 disposed typically in a shape broaden toward the end. A tip portion of the guide projection 11 is formed in an R-shape and has a predetermined width (length) w in the front and rear direction.

When forming a guide projection 11, it is possible to integrally form the guide projection 11 by directly transforming the bottom portion 109a of the fuel tank 109, that is, by the shell body of the fuel tank 109. Or else, other than to integrally form the guide projection 11 as above, a guide projection formed to have equivalent form and figuration by using a separate member can be fixed to the bottom portion 109a of the fuel tank 109 by heat plate fusing or the like.

The recessed and protruding portion 12, further detailedly, is constituted by a recessed portion 12A and a protruding portion 12B. As shown in FIG. 5, the recessed portion 12A of these is made by forming lower portions of both right and left surfaces of the casing 1 of the fuel pump unit 10 to have a narrow width, and this narrow portion is to fit between each of the pair of guide projections 11. In this case, the width of the recessed portion 12A is set to be slightly narrower than an interval (inner width) between each of the R-shaped tip portions of the guide projections 11, that is, practically not to generate looseness. Further, the recessed portion 12A is formed to extend for a substantial part of a length in a front and rear direction of the casing 1 as shown in FIG. 4 and the like, whereby a mutual sliding operation between the guide projection 11 and the recessed portion 12A is allowed as will be described later.

Figure 7:
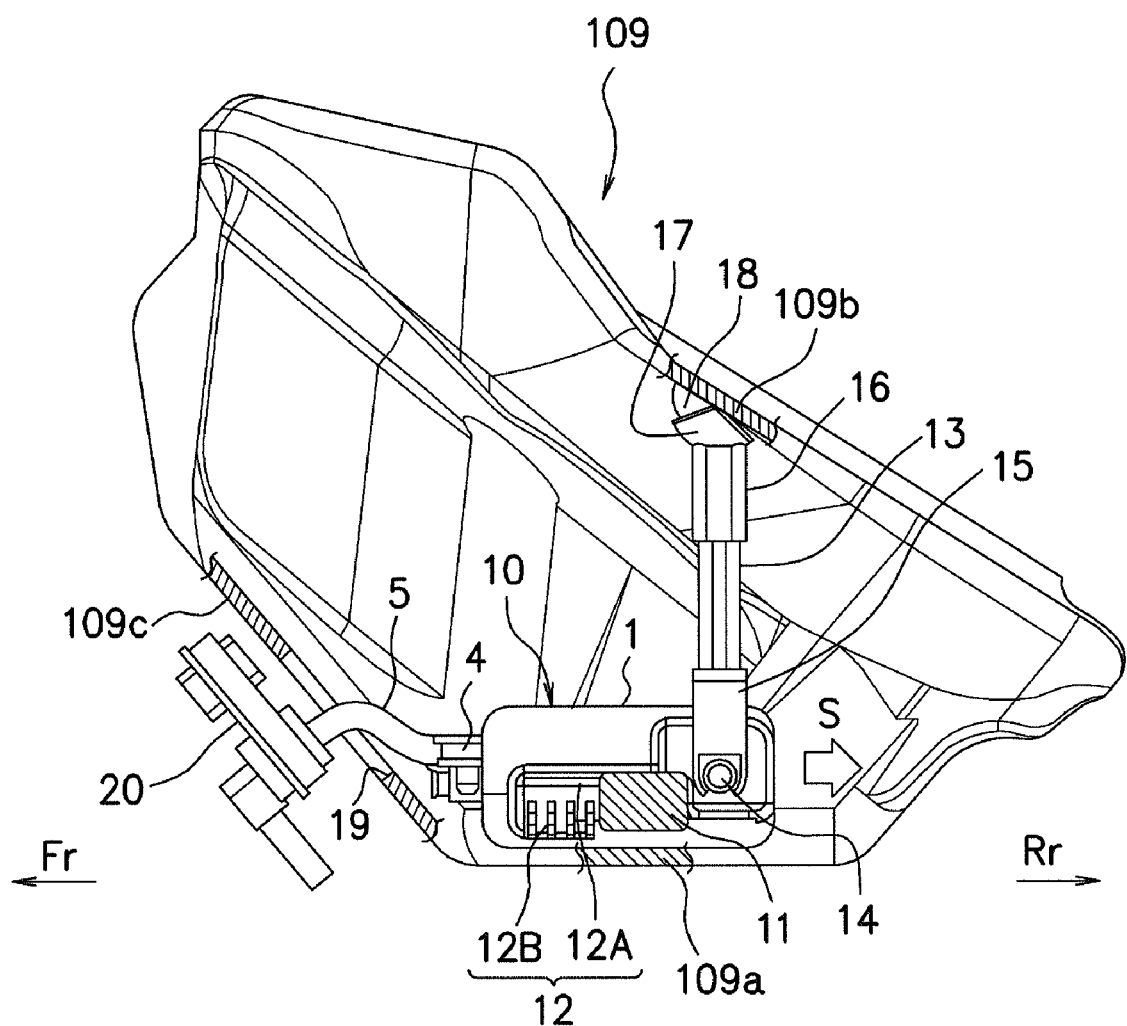
FIG. 7 is a view showing a process step at a time of mounting the fuel pump unit in the embodiment of the present invention.

The protruding portion 12B is constituted by a plurality of ribs formed in an up and down direction in the recessed portion 12A in a more front and lower position of the casing 1. As shown in FIG. 7 and the like, plural ribs (four in this example) are provided in line along the front and rear direction of the casing 1, and the line as a whole has a front and rear direction width practically equivalent to a front and rear direction width w of the guide projection 11. As shown in FIG. 5 and the like, the protruding portion 12B protrudes in an R-shape or in a curved shape from the recessed portion 12A to a guide projection 11 side in view of a longitudinal axis direction along the front and rear direction of the casing 1.

Next, the holding mechanism includes an expandable stay 13 which elastically biases the fuel pump unit 10 in a holding manner, the fuel pump unit 10 being supported at a mounting position (FIG. 2, FIG. 3 and the like). The stay 13 is bridged between the ceiling portion 109 of the fuel tank 109 and a rear portion of the casing 1, and is to bias the casing 1 backward. In the fuel pump unit 10 at the mounting position, as shown in FIG. 5, the guide projection 11 and the recessed and protruding portion 12 are engaged to each other and the holding mechanism acts to hold the guide projection 11 and the recessed and protruding portion 12 in such an engagement state.

In a concrete constitution of the holding mechanism, as shown in FIG. 4 and the like, there is a gate type bracket 15 rotatably supported around an support axis 14 having an axis in the right and left direction behind the casing 1, and the stay 13 is standingly provided on an upper portion (upper edge portion of a gate shape) of the bracket 15. The stay 13 fits with a holder 16 slidably with each other in an axis direction thereof, and by sliding, the stay 13 and the hold 16 as a whole expand and contract. It should be noted that a not-shown spring (compression coil spring) is attached in the stay 13 and the holder 16 in the axis direction and are biased by an elastic force of the spring in an expansion direction.

On an upper end portion of the holder 16, preferably a sphere receiver 17 is provided, while in the ceiling portion 109b of the fuel tank 109 a supporting sphere 18 is projectingly provided. Curvature radiuses of the sphere receiver 17 and the supporting sphere 18 are practically the same, the sphere receiver 17 being about ¼ of the entire sphere in size, and the supporting sphere 18 being about half of the entire sphere. The sphere receiver 17 and the supporting sphere 18 contact each other in surface-to-surface contact and the stay 13 can be rotated with the supporting sphere 18 being a fulcrum. When the fuel pump unit 10 is at the mounting position, the stay 13 tilts, as shown in FIG. 3 and the like, in a manner that the supporting shaft 14 is displaced in a more rear position than the supporting sphere 18.

Figure 6:
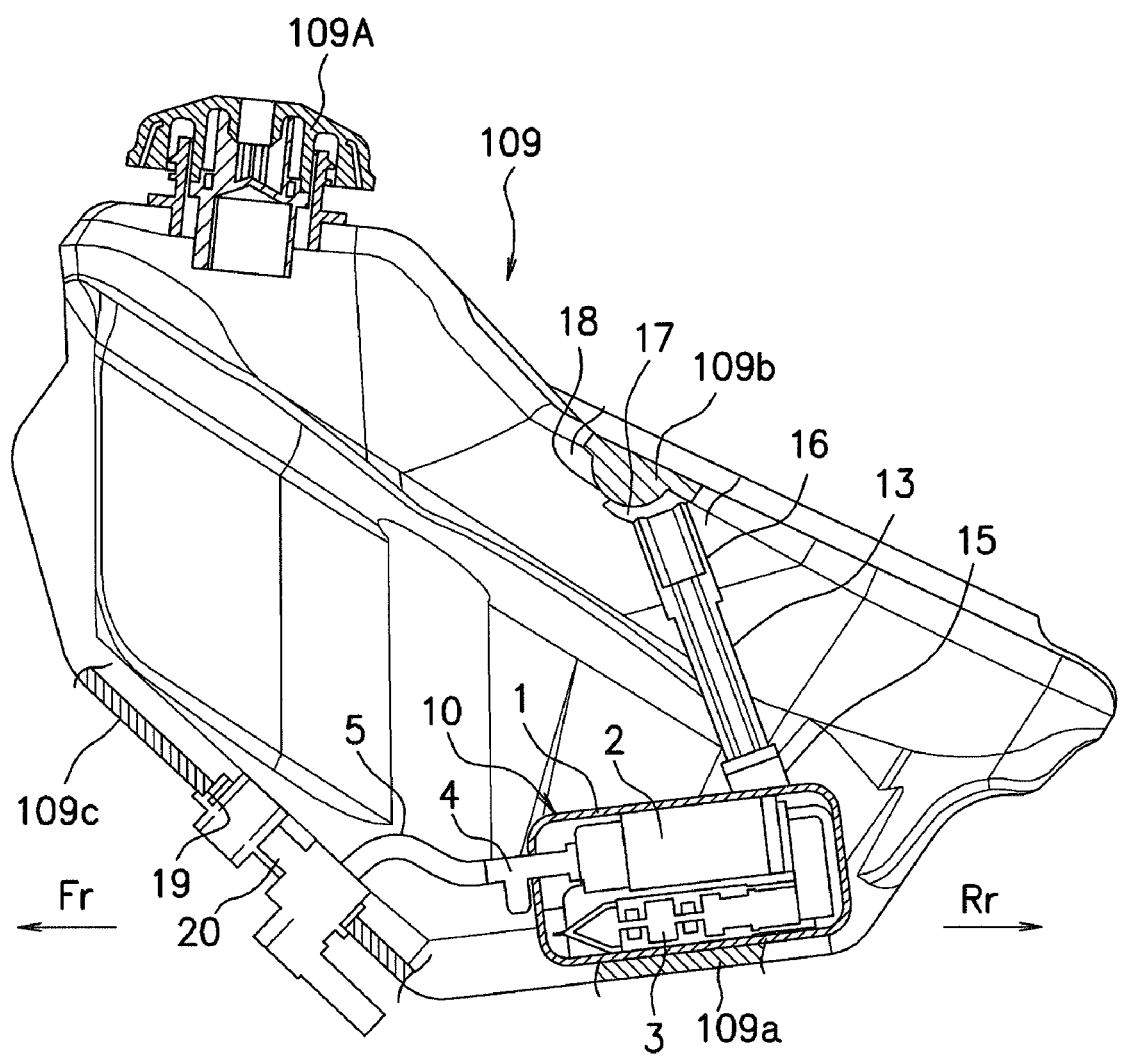
FIG. 6 is a cross-sectional view showing a constitution example of the fuel tank on which the fuel pump unit in the embodiment of the present invention is mounted.

Here, a fuel pump 2, a filter 3 and the like are housed in the casing 1 of the fuel pump unit 10 as shown in FIG. 5 and FIG. 6. The electric fuel pump 2 absorbs fuel in the fuel tank 109 via the filter 3 and the fuel is further supplied from a discharge pipe 4 to a fuel tube 5. The fuel tube 5 is extended to the outside of a forward inclined portion 109c and fuel is supplied to a fuel injector of the throttle body.

Further, as shown in FIG. 3 and the like, an opening portion 19 is provided in a front of the guide projection 11 in a neighborhood of a lower portion of the forward inclined portion 109c, and a lid member 20 is coveringly fixed on the opening portion 19. In this case, the cover member 20 is formed in a flange shape, a not-shown sealing means such as an O-ring is intervened between the flange portion and a peripheral edge portion of the opening portion 19, and the cover member 20 is fastened to the forward inclined portion 109c by a screw or the like. Further, the opening portion 19 is typically circular, and a diameter D thereof is set to be one size larger (by several about mm) than a maximum width (or diameter) d of the casing 1 including the bracket 15 as shown in FIG. 5. Thereby, the fuel pump unit 10 can be inserted into the fuel tank 109 via the opening portion 19.

In the above-described constitution, first, a case in which the fuel pump unit 10 is mounted on the fuel tank 109 as an intank system will be described.

In the fuel pump unit 10, the stay 13 is standingly provided via the bracket 15, the fuel tube 5 is extended from the casing 1, and further the fuel tube 5 is inserted into the cover member 20. The stay 13 is first inserted into the opening portion 19, and the casing 1 is inserted while a relative rotation angle with the stay 13 is adjusted. While the sphere receiver 17 of an upper end of the stay 13 is directed to the supporting sphere 18, the casing 1 is put between the inner width of the pair of guide projections 11.

In this case, while the sphere receiver 17 is abutted on the supporting sphere 18, the portion of the recessed portions 12A of the both side surfaces of the casing 1 is inserted between the guide projections 11. Thereby, as shown in FIG. 7, while the stay 13 is made in an almost vertical state, the casing 1 is seated on the bottom portion 109a of the fuel tank 109. On this occasion, the guide projection 11 is displaced from the rib of the protruding portion 12B, so that the guide projection 11 and the rib of the protruding portion 12B do not interfere with each other.

Next, the casing 1 is slide-moved backward (FIG. 7, arrow S) from a state in FIG. 7 and the cover member 20 is fitted into the opening portion 19. By the backward movement of the casing 1, the protruding portion 12B gets in a lower side of the guide projection 11, and the R-shaped tip portion of the guide projection 11 is engaged to the recessed portion 12A in its upper side and to the protruding portion 12B in its lower side as shown in FIG. 4 and FIG. 5. It should be noted that the casing 1 is designed to stop by abutting on a stopper provided in the fuel tank 109. In this case, since the stay 13 is expandable as described above, the stay 13 gradually expands from a state of FIG. 7. The stay 13 receives a load F in the axis direction by the elastic force of the built-in spring between the stay 13 and the holder 16, and the stay 13 is held at the mounting position of FIG. 3 by a practically horizontal component $F_h$ of the load F. As described above, the casing 1 is position-restrained in an up and down/right and left direction and a front and rear direction, and is properly fixed to a predetermined position of the bottom portion 109a of the fuel tank 109.

In the fuel pump mounting structure of the present invention, the fuel pump unit 10 (casing 1 in particular) and the cover member 20 are assembled each independently in the fuel tank 109, and the cover member 20 is constituted as a separate body from the supporting mechanism and the holding mechanism of the fuel pump unit 10. Even in cases in which a load of the fuel pump unit 10 is not applied to the cover member 20 at all, a case in which a vehicle jumps in particular, an excessive load does not work. Thereby, no burden is applied to the surroundings of the seal portion of the cover member 20, whereby high oil-tightness can be secured and maintained for a long period.

Further, when the fuel pump unit 10 is mounted on the fuel tank 109, the fuel pump unit 10 can be accurately fixed at a predetermined position without requiring a tool for mounting and fixing. A mounting operation does not take trouble and a handling capability is excellent.

Further, since the fuel pump unit 10 is mounted on the bottom portion 109a of the fuel tank 109, a capacity of the fuel tank 109 can be utilized at the maximum, whereby a dead remaining amount of the fuel can be suppressed to the minimum. Further, there is an advantage such that a common fuel pump unit 10 can be used without regard to a shape of the fuel tank 109.

Hereinabove, the present invention is described with various embodiments. However, the present invention is not limited to these embodiments but modification or the like is possible within a range of the present invention.

The sphere receiver 17 and the supporting sphere 18 can be provided in a reverse relation of the above-described embodiment, that is, a supporting sphere 18 can be provided in a holder 16 side and a sphere receiver 17 can be provided in a ceiling 109b side of a fuel tank 109.

Further, the constitution of the guide projection 11 and the recessed and protruding portion 12 can be designed in a reverse relation to the above-described embodiment. For example as shown in FIG. 8, a basic constitution of a right and left pair of guide projections 11 is similar to that of the above-described embodiment, but a recessed portion 22A is formed in a tip portion of the guide projection 11. Meanwhile, a projection portion engage-supported by the recessed portion 22A is projectingly provided in a lower portion of right and left side surfaces of the casing 1. The projection portion 21 has a width (length) w in a front and rear direction. Further, the guide projection 11 is provided with a protruding portion 22B at a position displaced backward from its front end portion by a length w, thereby to be able to be engaged to an upper portion of the projection portion 21. It should be noted that a front and rear direction length of the protruding portion 22B is about w.

As a result that the projection portion 21 of the casing 1 even in the above constitution is engagedly supported by the recessed and protruding portions 22 constituted by the recessed portion 22A and the protruding portion 22B from above and below the projection portion 21, the casing 1 can be supported properly and accurately.

According to the present invention, a fuel pump unit and a cover member are constituted each independently to have separate bodies, a load is not applied to surroundings of a seal portion of the cover member, whereby high oil-tightness can be secured and maintained for a long period. Further, when the fuel pump unit is mounted, the fuel pump unit can be accurately fixed at a predetermined position without requiring a tool for mounting and fixing. There can be obtained an effect such that a mounting operation does not take trouble and a handling capability is excellent.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A fuel pump mounting structure of a motorcycle for mounting a fuel pump unit on a predetermined position in a fuel tank, the fuel pump mounting structure comprising:
    a supporting mechanism supporting the fuel pump unit at a mounting position thereof; and
    a holding mechanism fixing and holding the fuel pump unit supported at the mounting position,
    wherein an opening portion from which the fuel pump unit is inserted into the fuel tank is closed by a cover member being a separate body from said supporting mechanism and said holding mechanism,
    wherein said holding mechanism includes an expandable stay member elastically biasing the fuel pump unit supported at the mounting position in a holding manner, and
    wherein, with one end of the holding mechanism directly adjoining a ceiling portion of the fuel tank and pressing the fuel pump unit to a bottom portion of the fuel tank, the holding mechanism is configured to adjustably fix a position of the fuel pump unit to the fuel tank.

2. The fuel pump mounting structure of the motorcycle according to claim 1,
    wherein, in a state assembling a fuel pump, the holding mechanism always biases the fuel pump in the accommodated direction thereof by a horizontal direction component force $F_h$ of the bias of force F.

3. The fuel pump mounting structure of the motorcycle according to claim 2,
    wherein said supporting mechanism includes a guide projection provided in a bottom portion of the fuel tank and a recessed and protruding portion provided in a side surface portion of the fuel pump unit, and the guide projection and the recessed and protruding portion are engaged to each other thereby to support the fuel pump unit.

4. The fuel pump mounting structure of the motorcycle according to claim 3,
    wherein the recessed and protruding portion of said supporting mechanism and said holding mechanism are constituted integrally with the fuel pump unit and are inserted into the fuel tank via the opening portion.

* * * * *